(12) United States Patent
Gaubatz et al.

(10) Patent No.: US 9,020,291 B2
(45) Date of Patent: Apr. 28, 2015

(54) RESIZED IMAGE COMPRESSION BASED ON FREQUENCY CONTENT

(75) Inventors: Matthew D. Gaubatz, Seattle, WA (US); Aaron Chan, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 120 days.

(21) Appl. No.: 13/600,611

(22) Filed: Aug. 31, 2012

(65) Prior Publication Data

US 2014/0064631 A1 Mar. 6, 2014

(51) Int. Cl.
| | |
|---|---|
| *G06K 9/36* | (2006.01) |
| *H04N 19/124* | (2014.01) |
| *H04N 19/132* | (2014.01) |
| *H04N 19/14* | (2014.01) |
| *H04N 19/176* | (2014.01) |
| *H04N 19/18* | (2014.01) |
| *H04N 19/59* | (2014.01) |

(52) U.S. Cl.
CPC ............ *H04N 19/18* (2014.11); *H04N 19/124* (2014.11); *H04N 19/132* (2014.11); *H04N 19/14* (2014.11); *H04N 19/176* (2014.11); *H04N 19/59* (2014.11)

(58) Field of Classification Search
None
See application file for complete search history.

(56) References Cited

U.S. PATENT DOCUMENTS

| | | | |
|---|---|---|---|
| 4,386,366 A | 5/1983 | Mori | |
| 4,467,346 A | 8/1984 | Mori | |
| 4,580,162 A | 4/1986 | Mori | |
| 4,656,500 A | 4/1987 | Mori | |
| 4,831,636 A | 5/1989 | Taniguchi et al. | |
| 4,860,313 A | 8/1989 | Shpiro | |
| 4,922,273 A | 5/1990 | Yonekawa et al. | |
| 5,157,488 A | 10/1992 | Pennebaker | |
| 5,559,557 A | 9/1996 | Kato | |
| 6,175,650 B1 | 1/2001 | Sindhu et al. | |
| 6,252,994 B1 * | 6/2001 | Nafarieh | 382/253 |
| 6,304,271 B1 * | 10/2001 | Nehme | 345/620 |
| 7,092,578 B2 | 8/2006 | Kakarala et al. | |
| 7,409,099 B1 | 8/2008 | Ameres et al. | |
| 7,536,058 B2 | 5/2009 | Matsutani | |
| 7,751,633 B1 | 7/2010 | Mukherjee | |
| 8,077,990 B2 | 12/2011 | Islam | |
| 8,270,766 B1 * | 9/2012 | Avidan et al. | 382/284 |
| 8,625,917 B2 | 1/2014 | Zheng et al. | |
| 2003/0077002 A1 * | 4/2003 | Silverstein et al. | 382/282 |
| 2003/0234798 A1 * | 12/2003 | Ratnakar | 345/660 |

(Continued)

FOREIGN PATENT DOCUMENTS

WO WO-2012060769 5/2012

OTHER PUBLICATIONS

Strom, J, "Dead Zone Quantization in Vavelet Image compression Mini Project in ECE 253a", May 12, 1996.

(Continued)

*Primary Examiner* — Li Liu
(74) *Attorney, Agent, or Firm* — Hewlett-Packard Patent Department

(57) ABSTRACT

Examples disclosed herein relate to compressing an image by resizing an image and compressing the resized image based on frequency content. A processor may resize an image to a target size if the pixel area of the image is greater than the sum of the target pixel area plus a resizing tolerance. The processor may compress the image using a first data removal rule for a portion of the image of a first frequency range and using a second data removal rule for a portion of the image of a second frequency range.

19 Claims, 4 Drawing Sheets

(56) References Cited

U.S. PATENT DOCUMENTS

| | | | |
|---|---|---|---|
| 2007/0025637 A1 | 2/2007 | Setlur et al. | |
| 2007/0200939 A1* | 8/2007 | Matsuyama | 348/240.1 |
| 2008/0008395 A1 | 1/2008 | Liu | |
| 2011/0244793 A1* | 10/2011 | Nagao | 455/41.1 |
| 2011/0299790 A1* | 12/2011 | Chan et al. | 382/239 |
| 2012/0263392 A1* | 10/2012 | Wang et al. | 382/250 |
| 2013/0004072 A1* | 1/2013 | Liu et al. | 382/173 |

OTHER PUBLICATIONS

Nostratinia, A. et al. "Subband Image Compression" The International Series in Engineering and Computer Science, vol. 504, 1999, pp. 255-293.

Gersho & Gray. Vector Quantization and Signal Compression. p. 151, Chapter 5. Section 5.4. 2001.

Nostratinia, A. et al, "Subband Image Compression" The International Series in Engineering and Computer Science, vol. 504, 1999, pp. 255-293.

Olshevsky & Ozdaglar. On Distributed Averaging Algorithms and Quantization Effects. Automatic Control, IEEE Transactions on, pp. 2506-2514, vol. 54, Issue 11, Nov. 2009.

Pennebaker & Mitchell. JPEG: Still Image Data Compression Standard. Chapter 4. 2004.

Pennebaker, J. et al., Excerpts from: JPEG: Still image compression standard, 1993, pp. 34-38, 264-266, 331-332, and 376, Kluwer Academic Publishers.

Bakshi, M. et al., "Improving the visual quality of JPEG-encoded images via companding," Journal of Electronic Imaging 6.2, Apr. 1997, pp. 189-197.

Bandy C. P. et al., "A low bandwidth, still image transmission system," Proceedings of IEEE Southeastcon, 1995, pp. 389-398.

Beretta, G., "Compressing Images for the Internet," Tech Report HPL-97-163, 1997.

Bhaskaran, V. et al., "Text and Image Sharpening of Scanned Images in the JPEG Domain," 1997, IEEE ICIP 1997, vol. 2, pp. 326-329.

Gersho, A, et al., Excerpts from Chapter 5, Section 5.4, Vector Quantization and Signal Compression, 2001, pp. 151 and 156.

Herley, C., "Storage of Digital Camera Images," Image Processing, 1999, IEEE ICIP 1999, vol. 3, pp. 940-942.

Merhav, N., "Embedding Companders in JPEG Compression," Tech Report HPL-98-141, 1998, 14 pages.

Nedic, A. et al., "On Distributed Averaging Algorithms and Quantization Effects," IEEE Transactions on Automatic Control, vol. 54, No. 11, Nov. 2009, pp. 2506-2517.

Pennebaker, J. et al., Excerpts from: JPEG: Still image compression standard, 1993, pp. 34-37, 264-266, 331-332, and 376, Kluwer Academic Publishers.

Said, A. et al., "A New Fast and Efficient Image Codec Based on Set Partitioning in Hierarchical Trees," IEEE Transactions on Circuits and Systems for Video Technology, vol. 6, Jun. 1996, pp. 243-250.

Simard, P. et al., "On-Line Adaptation in Image Coding with a 2-D Tarp Filter," Microsoft Research, Proc. IEEE DCC, Apr. 2002, pp. 23-32.

Skodras, A. et al., "The JPEG 2000 Still Image Compression Standard," IEEE Signal Processing Magazine, Sep. 2001, vol. 18, No. 5, pp. 36-58.

Wang, Z. et al., "Image quality assessment: from error visibility to structural similarity," Image Processing, IEEE Transactions, vol. 13, No. 4, 2004, pp. 600-612.

Yu, J., "Advantages of uniform scalar dead-zone quantization in image coding system," 2004, 2004 International Conference on Communications, Circuits and Systems, IEEE, vol. 2, pp. 805-808.

* cited by examiner

RESIZED IMAGE COMPRESSION BASED ON FREQUENCY CONTENT

BACKGROUND

An image file may be compressed to make the image smaller for use, such as for upload or storage. A compression method may map the image data to new data, and in some cases, remove some of the image data from the compressed version. JPEG is an example of an image compression scheme that may be used to make a raw image a smaller size for manipulation, uploading, and storage.

BRIEF DESCRIPTION OF THE DRAWINGS

The drawings describe example embodiments. The following detailed description references the drawings, wherein.

DETAILED DESCRIPTION

Figure 1:
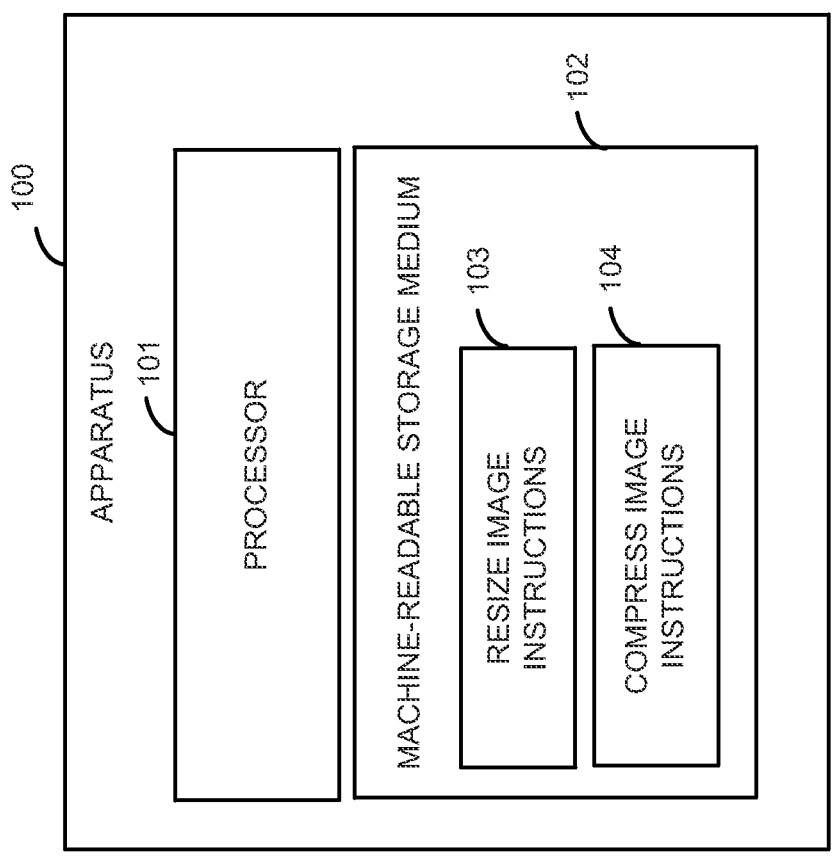
FIG. 1 is a block diagram illustrating one example of an apparatus to compress an image.

An image compression scheme may be designed to make an image smaller in a manner that preserves image quality. In one implementation, an image compression scheme first determines whether to compress an image or whether to resize the image to a smaller pixel area and then compress the image. A compression scheme may be applied to the conditionally resized image that removes data from higher frequency content with a different rule than a rule used to remove data from the lower frequency content in the image. For example, a frequency-adaptive non-uniform quantizer may be used. The quantization rule for the higher frequency content may remove more data than the quantization rule for the lower frequency content. The compression may be performed in conjunction with a standardized compression method. For example, a quantization function, a function for determining which data to remove during compression, associated with a standard compression method may be adjusted to remove data in higher frequency content and a different rule may be used to remove content in lower frequency content.

Using resizing in addition to compression may improve the compressed image quality. For example, the limitations of a compression scheme may be addressed by resizing the image to a pixel area that results in better quality compression. The resizing may be conditional. For example, if the image pixel area is above a threshold, it may be resized smaller, but if the image pixel area is below the threshold, it may not be resized. The image may be resized based on both the target pixel area and the original image size to prevent the image from being resized to a pixel area too close to the original image pixel area. In some cases, resizing an image to a target pixel area if the image pixel area is too close to the target pixel area may degrade the quality of the resized image significantly. The image may be resized to a size smaller than the target area pixel plus a resizing tolerance. The resizing tolerance may be based on the original size of the image. Taking into account both the target size and the original image size may prevent image degradation problems from occurring and may result in preservation of important image information, creating a higher quality compressed image.

Adapting the compression of the conditionally resized image based on the frequency content may result in a better quality compressed image. The compression scheme may take into account the value of the data to be removed to compress the image file. Removing data with a non-frequency-adaptive rule for discarding data may result in a lower quality image with perceived boundaries and other artifacts. For example, a lower quality compressed image may be produced even where different amounts of data are discarded from different frequency components of the image if the same quantization rule for removing data is used for different frequency content. A rule for discarding data that varies with frequency may avoid some of these problems.

A smaller size of a compressed image may allow for faster upload and for easier storage. As more images are stored in the cloud, the cost of storing a larger image file may be increased. It may be desirable to upload and store smaller images without greatly compromising image quality. Together the resizing and compression scheme may result in a smaller and higher quality compressed image.

FIG. 1 is a block diagram illustrating one example of an apparatus 100 to compress an image. The apparatus 100 may receive an image via a network, access an image from a storage device, or create an image. The image may be a raw image file, and the apparatus 100 may create smaller version of the raw image file using resizing and compression methods. In some cases, the image is a compressed image, and the apparatus 100 recompresses the image to a smaller size.

The apparatus 100 may include a processor 101 and a machine-readable storage medium 102. The processor 101 may be, for example, a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium.

The machine-readable storage medium 102 may include resize image instructions 104 and compress image instructions 105. The resize image instructions 104 may include instructions to determine a target image pixel area for a received raw image, and to resize the image if the image pixel area is greater than the target pixel area plus a resizing tolerance. In one implementation, the machine-readable storage medium 102 further includes instructions for determining the target pixel area and/or the resizing tolerance based on a target compressed file bit budget and/or target compressed image quality. If the pixel area of the received raw image is less than the sum of the target pixel area plus the resizing tolerance, the image is not resized. The resizing tolerance may be calculated based on the original size of the image before compression. For example, the resizing tolerance may be a percentage of the original image size. As another example, the resizing tolerance may be a percentage of the target image size. Taking into account the resizing tolerance may allow for images close to the target pixel area not to be resized a very small amount to reach the target pixel area. In some cases, the image may be resized to a new size smaller than the target pixel area where the original image size is close to the target pixel area. The image may be resized in any suitable manner, such as a standardized method for removing data from the image to decrease the pixel area.

The compress image instructions 104 may include instructions to compress the image after it has been resized or determined not to be large enough for resizing. The compression image instructions 104 may compress different portions of the image differently. For example, the amount of data and method of data removal may be different for different portions of the image.

In one implementation, data is removed from higher frequency content using a different rule than is used on lower frequency content. For example, in areas with subtle changes, removing too much lower frequency content may cause the compressed image to appear more distorted. The compression method may use, for example, JPEG compression with a non-standard quantization function, the function for removing data, that is different for different frequency components of the image to achieve a different balance of data removal in the image. In one implementation, the quantization function for lower frequency content removes less data than the quantization function for higher frequency content due to the structure of the rule, as opposed to the degree to which it is applied. In one implementation, the quantization function for lower frequency content removes less data than the quantization function for higher frequency content due to the structure of the rule, in addition to the degree to which it is applied.

Figure 2:
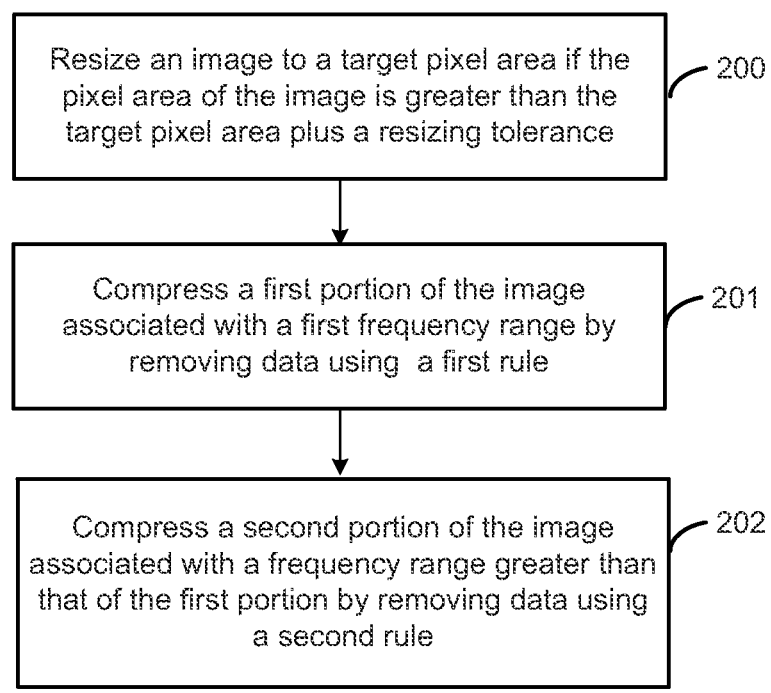
FIG. 2 is a flow chart illustrating one example of a method to compress an image based on frequency content applied to different portions of the image.

FIG. 2 is a flow chart illustrating one example of a method to compress an image based on frequency content delimited portions of the image. For example, some portions of the image may have higher frequency content. In one implementation, a raw image is resized to reduce the pixel area if the image area is above a threshold determined by a target size and the original size of the image. The threshold may be determined by the sum of a target size plus a tolerance amount such that the tolerance amount is determined based on the difference between the target size and the original image size. The resized image may then be compressed using a compression method that preserves data differently, and to a greater extent, in the lower frequency content of the image than in the higher frequency content. The method may be implemented, for example, by the apparatus 100 of FIG. 1.

Beginning at 200, a processor resizes an image to a target pixel area if the pixel area of the image is greater than the target pixel area plus a resizing tolerance. The processor may receive the image in any suitable manner. A user may upload the image to the processor, or the processor may access the image from a storage device. The processor may receive the image via a network. The image may be, for example, a raw image.

The processor may determine the image pixel area of the image. The processor may analyze the image to determine the image pixel area, or may access stored data indicating the image pixel area. The processor may compare the image pixel area to a target image pixel area plus a resizing tolerance. The target pixel area and resizing tolerance may be constant or may depend on additional factors. The processor may access information about the target pixel area and the resizing tolerance from a storage device. In some implementations, a user may indicate a target pixel area and/or resizing tolerance that corresponds to the desired quality level of the compressed image. The resizing tolerance may be determined as a percentage of the target image size and/or the original image size, such as where the image is resized to the target pixel area if the original image pixel area is at least ten percent greater than the target pixel area.

The processor may compare the image pixel area to a threshold of the sum of the target pixel area plus the resizing tolerance to resize the image if the image pixel area is greater than the threshold. The processor may then resize the image if the image size is greater than the threshold. The processor may use any suitable resizing method to reduce the pixel area of the image. For example, nearest neighbor interpolation, bilinear interpolation, or bicubic interpolation may be used. In one implementation, there are multiple resizing thresholds, such as based on different target pixel areas or different resizing tolerances. For example, an image pixel area greater than a first target pixel area plus a resizing tolerance may be resized to the first target pixel area, and an image pixel area greater than a second larger target pixel area plus a resizing tolerance may be resized to the second target pixel area. In some cases, there may be multiple pixel area targets based on the pixel area tolerance. For example, for a resizing tolerance of 5% of the target size, an image may be 3% greater than a first target pixel area and 6% greater than a second target pixel area. The image may be resized to the second target pixel area.

The input image may be a compressed image to be resized and recompressed using the method. For example, a smaller or better quality compressed image may be desirable. In one implementation, the compressed image may be decoded and partially resized simultaneously. The processor may analyze the compressed image to determine the set of possible sizes to which the compressed file can be decoded. The processor may then determine the smallest size from the set of possible sizes that is larger than the sum of the target size plus the resizing tolerance. The resizing tolerance used in this procedure may differ from other resizing tolerances discussed above. The processor may simultaneously decode the image and resize it to the determined size, then resize it from the determined size to the target size. An image file compression format, such as JPEG or JPEG-2000, enables an image to be resized to a certain set of sizes during the decoding process. In one implementation, $W_{temp}$ and $H_{temp}$ representing the dimensions of the image with the smallest size above the sum of the target pixel area plus the resizing tolerance may be chosen from the sets $\{W_{input}*2^{-n}\}$ and $\{H_{input}*2^{-n}\}$, respectively, for non-negative integer values of n in some range [0,N] where $W_{input}$ and $H_{input}$ represent the width and height of the original compressed image. In some implementations, the dimensions associated with the largest value of n such that the sum of the threshold target pixel area and the resizing tolerance, $A_{threshold+tolerance}$, that satisfies the relationship $A_{threshold+tolerance} \leq W_{temp}*H_{temp}=(W_{input}*2^{-n})*(H_{input}*2^{-n})$ may be chosen. In some implementations, the dimensions associated with a smaller value of n may be chosen where it is determined that doing so will create a better quality result. The image may then be conditionally resized from the selected size above the target pixel area to the target pixel area.

Continuing to 201, the processor compresses a first portion of the image associated with a first frequency range by removing data using a first rule. The processor may determine the first portion, for example, by determining a portion of the image associated with a frequency below a threshold by accessing stored information about the threshold. The threshold may be the same for each image, or may be dynamically determined by the processor. For example, the processor may determine the threshold based on information about the image, such as image subject, or based on a user defined threshold or image quality standard. The processor may determine the frequency range in any suitable manner.

In one implementation, a uniform quantization scheme is applied to portions of lower frequency content. A compression scheme may involve removing data by a mapping capable of converting real number data to integers, such as where image data 4.2 is mapped to 4. A uniform quantization scheme may be applied such that the same range of numbers is mapped to each integer. For example, any numbers in the range [0.5, 1.5) may be mapped to 1, and any numbers in the range [1.5, 2.5) may be mapped to 2. The numbers may be mapped by providing the numbers from the image as an input to the quantization function.

Proceeding to 202, the processor compresses a second portion of the image associated with a greater frequency range than the first portion by removing data using a different rule than was used on the first portion. The processor may determine the components of the image with a frequency range above a threshold in any suitable manner.

In one implementation, the processor may compress the image content associated with the frequency range above the threshold using a non-uniform quantization method. A non-uniform quantization scheme is applied to image content associated with a frequency range above the threshold such that quantization bins associated with mapped integers are different sizes, such as where a first range of values is mapped to an integer N and a second range of values is mapped to another integer M where the first and second ranges are not the same size. For example, a non-uniform quantization method may map differently sized regions of real numbers to different integers, such as where image data numbers in the range [0.8, 1.6) are mapped to 1 and where image data numbers in the range [1.6, 2.5) are mapped to 2 such that the range of numbers mapped to 1 is smaller. A non-uniform quantization method may map image data, such as image DCT coefficients, to integers using a quantization function that maps the real numbers to integers in a manner that does not uniformly map coefficients to integers with each mapped integer bin being the same size. In one implementation, the central bin, a bin representing the numbers mapped to zero, is larger than the other bins. In one implementation, an integer bin adjacent to the central bin is smaller than other integer bins. For example, a smaller range may be mapped to 1 than to 2, and the same size range may be mapped to 2, 3, and 4. In one implementation, the bin adjacent to the central bin maps values to an integer greater than 1. In another implementation, an integer bin adjacent to the central bin is larger than the other bins.

In one implementation, the processor uses more than two quantization rules. For example, image content associated with a first frequency range may be compressed using a first compression scheme, image content associated with a second frequency range may be compressed using a second compression scheme, and image content associated with a third frequency range may be compressed using a third compression scheme.

Figure 3:
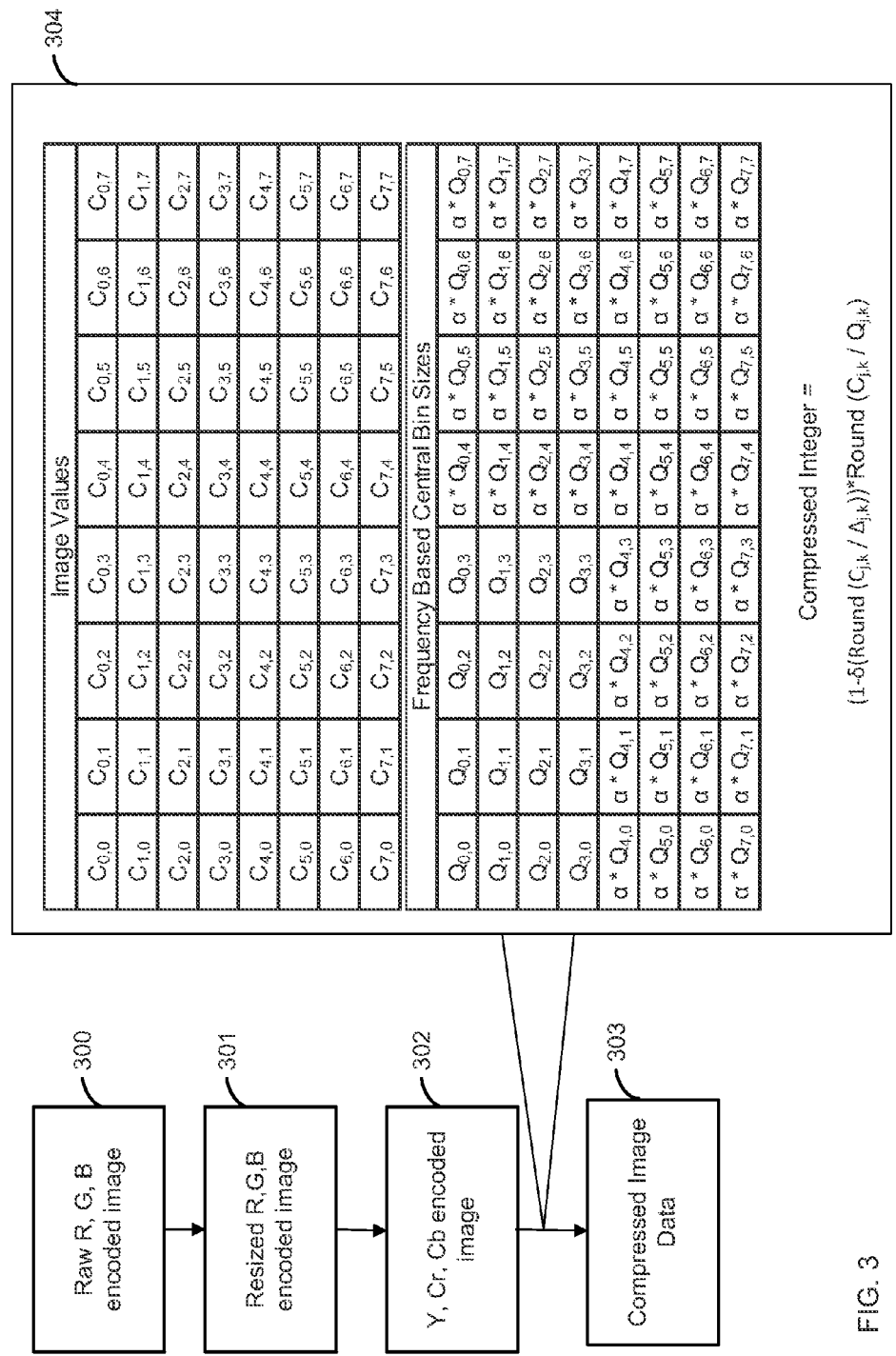
FIG. 3 is diagram illustrating one example of compressing an image based on frequency content applied to different portions of the image using a JPEG compression scheme.

FIG. 3 is an example diagram illustrating one example of compressing an image based on different rules for data associated with different frequency ranges using a JPEG compression scheme. Other image compression standards may be adapted in a similar manner.

JPEG uses a quantization function to reduce the amount of image data, and the reduced data is then compressed using Huffman encoding. In some implementations, R, G, B encoded images are mapped to a Y, Cb, Cr color space, and the Cb and Cr pixels are then down-sampled. The Y values and the down-sampled Cb and Cr values are transformed into block matrices representing frequency content where an 8×8 block of pixels is mapped to a block matrix. The matrix values are discrete cosine transform (DCT) coefficients that represent the amount of a particular 2D frequency in that 8×8 pixel area of the image. The DCT coefficients may be mapped to integers using a quantizer function to reduce the data. The integers may then be represented by Huffman codes for more efficient storage. In one implementation, the quantizer function may be adjusted in a manner that provides a smaller, higher quality compressed image.

Image 300 is a raw image with R, G, B encoding. The pixel values of the raw image are represented by their degree of red, green, and blue colors. Image 301 is a resized version of the image 300. The image may be resized maintaining the R, G, B encoding, but the image may be downsized to a smaller pixel area if the original raw image 300 is above a particular size. The smaller image 301 may include the pixels represented by their degree of red, green, and blue colors. At block 302, a JPEG scheme is used to map the R, G, B encoded pixels to Y, Cb, Cr encoded pixels.

The pixels may be divided into 8×8 matrices where the matrix values are coefficients representing the degree of content in that block of pixels composed of oscillations of different 2D frequencies. Compressing the image may involve mapping the coefficients to integers for storage. Mapping the data causes some image information data to be lost such that the image may be reconstructed without the original degree of precision.

Block 304 shows an example of transforming the coefficients in the image values table using a quantization factor from the quantization table. In the image values table, value $C_{j,k}$ represents the amount of the 8×8 block with horizontal frequency at level j and the vertical frequency at level k, meaning $C_{1,1}$ represents less vertical and horizontal oscillation than $C_{4,4}$. The coefficients are mapped to integer values using a quantization factor $Q_{j,k}$. The $Q_{j,k}$ factors used for each position are saved with the JPEG encoding such that the compression may be reversed. The standard uniform quantization operation is performed by dividing the $C_{j,k}$ value by the quantization factor associated with that position, and then rounding the result.

The rule for determining the quantization bin sizes may depend on the frequency of the content. As an example, let $\delta(\ )$ represent an indicator function, that is 1 one with an argument of 0 and is 0 for all other input values. The method Compressed Integer=$(1-\delta(\text{Round}(C_{j,k}/\Delta_{j,k})))*\text{Round}(C_{j,k}/Q_{j,k})$ may be used where $Q_{j,k}$ represents the quantization factor for the compressed integer. The central quantization bin size $\Delta_{j,k}$ is determined as a function of the quantization factor $Q_{j,k}$, and the function may differ based on the frequency content, such as $\Delta_{j,k}=f_{low}(Q_{j,k})$ for some j,k values representing lower frequency content and $\Delta_{j,k}=f_{high}(Q_{j,k})$ for other j,k values representing higher frequency content.

The dividing line between the lower frequency range and the higher frequency range may be determined, for example, based on the value of j or k being lower than the threshold, the value of j+k being lower than the threshold, or the value of j and k being lower than the threshold.

The quantization rule for the lower frequency content quantization factors may be determined in any suitable manner. In one implementation, the rule for determining the lower frequency central quantization bin size may be $f_{low}(Q_{j,k})=Q_{j,k}$ for $C_{j,k}$. Using this rule allows the compression to be performed using uniform compression in the lower frequency content where the same size range is mapped to each integer.

The quantization rule for the higher frequency content may be determined in any suitable manner. In one implementation, the method for determining the higher frequency central quantization bin size may be $f_{high}(Q_{j,k})=\alpha*Q_{j,k}$ for $C_{j,k}$, where $1\leq\alpha\leq2$. The rule may allow for the range of the integer bins to vary within the higher frequency content, creating a non-uniform compression scheme.

In one implementation, the quantization factors may be further based on the set values of $C_{j,k}$. For example, the quantization factor may be based on both on the index $(j_0,k_0)$ of a particular coefficient and whether the $C_{j,k}$ values in a given frequency range, i.e., for values (j,k) possibly including $(j_0,k_0)$ and color channel represent an average amount of energy that is above or below a particular threshold. As an example, where the energy is above a threshold in the higher frequency content, then a more aggressive quantization rule may be used. The central quantization bin size may be updated for $C_{j,k}$ values where the $C_{j,k}$ value is related to a color channel. In one implementation, different energy thresholds associated with the Y, Cb and Cr components are considered separately when compressing the Y, Cb and Cr components, respectively. In another implementation, the energy in the same subset of the Y, Cb and Cr components is considered to determine the quantization rule applied to all three components.

The compressed integers and the quantization factor table may be stored as the compressed image in Block 303. The compressed JPEG image may be stored, uploaded, or used for other purposes.

Figure 4:
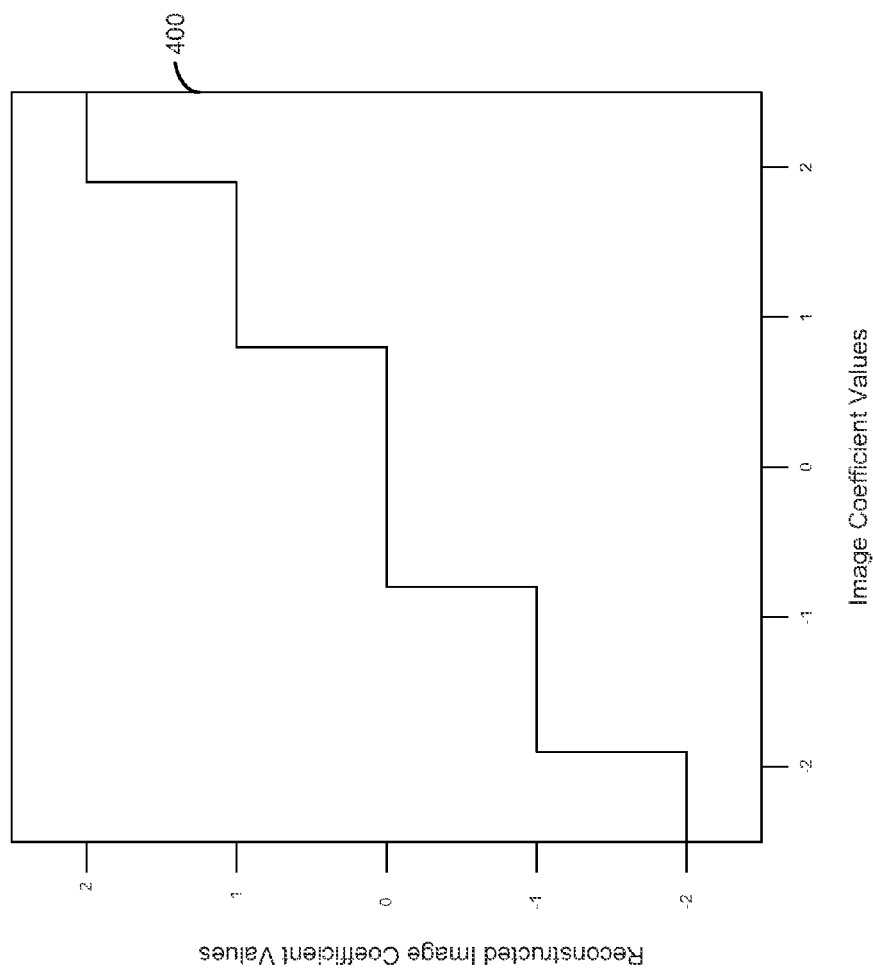
FIG. 4 is a diagram illustrating one example of mapping image data to compressed image values.

FIG. 4 is a diagram illustrating an example of mapping image data to compressed image values. If the quantizer is determined differently for different frequency content ranges, a non-uniformity in the size of ranges of numbers mapped to integers may be different for each frequency content range. The coefficients compressed to integers may be represented in bins, such as where the range on numbers compressed to 0 are in a first bin, the range of numbers compressed to 1 are in a second bin, and a range of numbers compressed to 2 are in a third bin. In one implementation, the central bin mapped to 0 may be widened, and the adjacent bins may be modified. For example, the 0 bin may be widened, and the −1 and 1 bins may be made smaller or widened by moving the edge of the bin that is farthest from 0. The higher the central quantization bin size, the more numbers that are compressed to the same number, 0. As an example, for a central bin size given by $f_{low}(Q_{j,k})=Q_{j,k}$, the quantization rule can be simplified to Integer=Round $(C_{j,k}/Q_{j,k})$. For different values of $\Delta_{j,k}$ however, this same property does not hold. For example, for $\Delta_{j,k}$ values where j or k are less than 4, the central bin width may be determined as a first function of $Q_{j,k}$, and the remaining $\Delta_{j,k}$ values are determined with a different function of $Q_{j,k}$. In another example, for $\Delta_{j,k}$ values where j+k is less than 3, the central bin width may be determined as a first function of $Q_{j,k}$, and the remaining $\Delta_{j,k}$ values are determined with a different function of $Q_{j,k}$. In yet another example, for $\Delta_{j,k}$ values where j and k is less than 2, the central bin width may be determined as a first function of $Q_{j,k}$, and the remaining $\Delta_{j,k}$ values are determined with a different function of $Q_{j,k}$. Having more coefficients mapped to 0 may provide some storage savings because representing 0 requires fewer bits than representing numbers with larger magnitudes. Furthermore, having coefficients mapped to 1 instead of 2, for example, may provide some storage benefit while maintaining a higher quality than that achieved by mapping the same coefficients to 0.

Compression performed by conditionally resizing an image and then adapting a compression scheme based on frequency content may result in a smaller higher quality compressed image. The image data removed during compression may be data that is less important to image quality, and less data may be removed in areas of an image where image quality is more dependent on image data precision. Higher quality smaller compressed images may result in faster upload and download times and smaller storage space while maintaining higher image quality.

The invention claimed is:

1. An apparatus, comprising:
a processor to:
resize an image to a target pixel area if the pixel area of the image is greater than the sum of the target pixel area plus a resizing tolerance between the initial pixel area of the image and the target pixel area; and
compress a first portion of the image using a first data removal rule for content of a first frequency range; and
compress a second portion of the image using a second data removal rule for a second frequency range.

2. The apparatus of claim 1, wherein the processor further determines the resizing tolerance as a percentage of the target size.

3. The apparatus of claim 1, wherein the first frequency range is lower than the second frequency range and where the first data removal rule comprises a uniform quantization compression scheme.

4. The apparatus of claim 1, wherein the first frequency range is lower than the second frequency range and where the second data removal rule comprises a non-uniform quantization compression scheme.

5. The apparatus of claim 1, wherein determining the first data removal rule and the second data removal rule is based on the data to be compressed.

6. The apparatus of claim 1, wherein the resizing tolerance is based on one of a target compressed file bit and a target compressed image quality.

7. The apparatus of claim 1, wherein the resizing tolerance is indicated by a user based on a desired quality level.

8. The apparatus of claim 1, wherein the processor further determines the resizing tolerance as a percentage of the original image size.

9. A method comprising:
comparing a pixel area of an image to target pixel area plus a resizing tolerance;
resizing the image to the target pixel area if the pixel area of the image is greater than the target pixel area plus the resizing tolerance;
compressing a first portion of the image associated with a first frequency range by removing data using a first rule; and
compressing a second portion of the image associated with a frequency range greater than that of the first portion by removing data using a second rule.

10. The method of claim 9, further comprising determining the resizing tolerance based on a particular a percentage of the target pixel area.

11. The method of claim 9, wherein the first rule comprises a uniform quantization rule and wherein the second rule comprises a non-uniform quantization rule.

12. The method of claim 9, wherein resizing the image to the target pixel area comprises:
determining a set of possible pixel area sizes of the image achievable through compressed image decoding;
selecting the smallest pixel area size in the set above the target pixel area plus the resizing tolerance; and
reducing the image to the selected pixel area size through compressed image decoding.

13. The method of claim 12, further comprising:
widening a central integer bin based on the first rule; and
modifying a non-central integer bin to adjust to the size of the central bin based on the second rule.

14. The method of claim 9, wherein the first rule selects a compression quantizer in a manner that maps a given range of numbers to different integer bins.

15. The method of claim 9, wherein the second rule selects a compression quantizer in a manner that maps a different range of numbers to different integer bins.

16. A machine-readable non-transitory storage medium comprising instructions executable by a processor to:
compare a pixel area of an image to a target pixel area plus a resizing tolerance between the pixel area of the image and the target pixel area;
alter the pixel area of the image to the target pixel area if the pixel area of the image is greater than the sum of a target pixel area plus the resizing tolerance;
apply a first compression rule to a first portion of the image with a first frequency range; and
apply a second compression rule to a second portion of the image with a second frequency range greater than the first frequency range.

17. The machine-readable non-transitory storage medium of claim 16, further comprising selecting the first rule based on an image coefficient value to be compressed by the first rule.

18. The machine-readable non-transitory storage medium of claim 16, wherein the first compression rule comprises a uniform quantization compression scheme and wherein the second compression rule comprises a non-uniform quantization compression scheme.

19. The machine-readable non-transitory storage medium of claim 16, wherein the image is a compressed image and further comprising instructions to:
determine possible decoded sizes of the image;
determine the smallest size of the decoded input image above the sum of the target pixel area plus a resizing tolerance;
resize the input image to a raw image of the smallest size above the sum of the target pixel area plus the resizing tolerance; and
resize the raw image from the smallest size above the sum of the target pixel area plus the resizing tolerance to the target pixel area if the pixel area of the image is greater than the sum of a target pixel area plus a resizing tolerance.

* * * * *